United States Patent
King

(10) Patent No.: US 8,433,591 B2
(45) Date of Patent: Apr. 30, 2013

(54) METHODS AND SYSTEMS FOR INVESTMENT APPRAISAL FOR MANUFACTURING DECISIONS

(75) Inventor: Nigel King, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2218 days.

(21) Appl. No.: 10/816,325

(22) Filed: Mar. 31, 2004

(65) Prior Publication Data

US 2005/0228759 A1   Oct. 13, 2005

(51) Int. Cl.
*G06Q 10/00* (2012.01)
(52) U.S. Cl.
USPC .......................................... 705/7.11; 705/1.1
(58) Field of Classification Search ................. 705/7.11, 705/1.1
See application file for complete search history.

(56) References Cited

U.S. PATENT DOCUMENTS

| | | | |
|---|---|---|---|
| 6,119,102 A * | 9/2000 | Rush et al. | 705/29 |
| 6,785,805 B1 * | 8/2004 | House et al. | 713/1 |
| 6,895,382 B1 * | 5/2005 | Srinivasan et al. | 705/7 |
| 6,904,449 B1 * | 6/2005 | Quinones | 709/203 |
| 7,120,596 B2 * | 10/2006 | Hoffman et al. | 705/28 |
| 2004/0059627 A1 * | 3/2004 | Baseman et al. | 705/10 |

OTHER PUBLICATIONS

Seal et al., "Enacting a European supply chain: a case study on the role of management accounting", Management Accounting Research, 1999, 10, 303-322.*
Bruce S. Buchowicz, "A process model of make-vs.-buy decision-making; the case of manufacturing software" IEEE Transactions on Engineering Management 38(1):24-32, Feb. 1991.
Ravi Venkatesan, "Strategic sourcing: to make or not to make" Harvard Business Review, pp. 1-11, Nov.-Dec. 1992.
Wesley H. Higaki, "Applying an improved economic model to software buy-versus-build decisions" Hewlett-Packard Journal, 46(4):61-66, Aug. 1995.
C.K. Prahalad and Gary Hamel, "The core competence of the corporation" Harvard Business Review on Pointy Article, pp. 1-15, May-Jun. 1990.
James Brian Quinn and Frederick G. Hilmer, "Strategic Outsourcing" Sloan Management Review, Massachusetts Institute of Technology 35(4):43-55 (Summer 1994).

* cited by examiner

*Primary Examiner* — Thomas Mansfield
(74) *Attorney, Agent, or Firm* — Kilpatrick Townsend & Stockton LLP

(57) ABSTRACT

A computer implemented method for deciding and justifying make or buy decisions in which it is determined whether to make an item in-house or to buy the item from outside suppliers. Also disclosed are computer implemented methods of determining and justifying an optimal timing to implement an engineering change order in which a more expensive item is replaced with a less expensive item.

14 Claims, 5 Drawing Sheets

FIG. 2

| File | Edit | View | Go | Help | | | | | | |
|---|---|---|---|---|---|---|---|---|---|---|
| Make or Buy Analyzer | | | | | | | | | | |
| | | | | | | Discount Rate | | 10% | Capacity Costs | |
| | | | | | | As of Date | | 1/1/2003 | Cost Type | Amount |
| | | | | | | Daily Rate | | 1.0003 | Plant | 15000 |
| | | | | | | | | | Floor Layout | 20000 |
| | | | | | | | | | Building Costs | 18750 |
| | | | | | | | | | | 53750 |
| | | | | | | Present Value of Opportunity Costs: | | | | 47504 |
| Item | MRP Quantity | Schedule Date | Variable Unit Cost | Purchase Price | Unit Opportunity Cost | Total Opportunity Cost | Days to Discount | NPV | | |
| 1001 | 100 | 1/1/2003 | 120 | 150 | 30 | 3000 | 0 | 3000 | | |
| 1001 | 100 | 1/31/2003 | 120 | 150 | 30 | 3000 | 30 | 2973 | | |
| 1001 | 100 | 3/2/2003 | 120 | 150 | 30 | 3000 | 60 | 2946 | | |
| 1001 | 100 | 4/1/2003 | 120 | 150 | 30 | 3000 | 90 | 2920 | | |
| 1001 | 100 | 5/1/2003 | 120 | 150 | 30 | 3000 | 120 | 2894 | | |
| 1001 | 100 | 5/31/2003 | 120 | 150 | 30 | 3000 | 150 | 2868 | | |
| 1001 | 100 | 6/30/2003 | 120 | 150 | 30 | 3000 | 180 | 2842 | | |
| 1001 | 100 | 7/30/2003 | 120 | 150 | 30 | 3000 | 210 | 2817 | | |
| 1001 | 100 | 8/29/2003 | 120 | 150 | 30 | 3000 | 240 | 2792 | | |
| 1001 | 100 | 9/28/2003 | 120 | 150 | 30 | 3000 | 270 | 2767 | | |
| 1001 | 100 | 10/28/2003 | 120 | 150 | 30 | 3000 | 300 | 2742 | | |
| 1001 | 100 | 11/27/2003 | 120 | 150 | 30 | 3000 | 330 | 2717 | | |
| 1001 | 100 | 12/27/2003 | 120 | 150 | 30 | 3000 | 360 | 2693 | | |
| 1001 | 100 | 1/26/2004 | 120 | 150 | 30 | 3000 | 390 | 2669 | | |
| 1001 | 100 | 2/25/2004 | 120 | 150 | 30 | 3000 | 420 | 2645 | | |

EDIT   CANCEL

FIG. 4

ECO Timing Optimization

| | | | | | | Discount Rate | 10% | Obsolesence Costs | | |
|---|---|---|---|---|---|---|---|---|---|---|
| | | | | | | As of Date | 1/1/2003 | Quatity Onhand | Unit Price | Total |
| | | | | | | Daily Rate | 1.0003 | 400 | 30 | 12000 |
| Item | MRP Quantity | Schedule Date | Pre ECO Standard Cost | Post ECO Standard Cost | Unit Opportunity Cost | Total Opportunity Cost | | Days to Discount | NPV | Remaining Obsolesence |
| 1001 | 100 | 1/1/2003 | 120 | 150 | 30 | 3000 | | 0 | 3000 | 9000 |
| 1001 | 100 | 1/31/2003 | 120 | 150 | 30 | 3000 | | 30 | 2973 | 6027 |
| 1001 | 100 | 3/2/2003 | 120 | 150 | 30 | 3000 | | 60 | 2946 | 3081 |
| 1001 | 100 | 4/1/2003 | 120 | 150 | 30 | 3000 | | 90 | 2920 | 161 |
| 1001 | 100 | 5/1/2003 | 120 | 150 | 30 | 3000 | | 120 | 2894 | 0 |
| 1001 | 100 | 5/31/2003 | 120 | 150 | 30 | 3000 | | 150 | 2868 | 0 |
| 1001 | 100 | 6/30/2003 | 120 | 150 | 30 | 3000 | | 180 | 2842 | 0 |
| 1001 | 100 | 7/30/2003 | 120 | 150 | 30 | 3000 | | 210 | 2817 | 0 |
| 1001 | 100 | 8/29/2003 | 120 | 150 | 30 | 3000 | | 240 | 2792 | 0 |
| 1001 | 100 | 9/28/2003 | 120 | 150 | 30 | 3000 | | 270 | 2767 | 0 |
| 1001 | 100 | 10/28/2003 | 120 | 150 | 30 | 3000 | | 300 | 2742 | 0 |
| 1001 | 100 | 11/27/2003 | 120 | 150 | 30 | 3000 | | 330 | 2717 | 0 |
| 1001 | 100 | 12/27/2003 | 120 | 150 | 30 | 3000 | | 360 | 2693 | 0 |
| 1001 | 100 | 1/26/2004 | 120 | 150 | 30 | 3000 | | 390 | 2669 | 0 |
| 1001 | 100 | 2/25/2004 | 120 | 150 | 30 | 3000 | | 420 | 2645 | 0 |
| 1001 | 100 | 3/26/2004 | 120 | 150 | 30 | 3000 | | 450 | 2621 | 0 |
| 1001 | 100 | 4/25/2004 | 120 | 150 | 30 | 3000 | | 480 | 2598 | 0 |

EDIT   CANCEL

METHODS AND SYSTEMS FOR INVESTMENT APPRAISAL FOR MANUFACTURING DECISIONS

BACKGROUND OF THE INVENTION

1. Field of the Invention

The present invention relates to methods and systems for appraising investments for manufacturing decisions. More particularly, embodiments of the present invention related to evaluating the so-called "make vs. buy decision"; that is whether a company should buy an item from outside sources or should instead make or develop the capability of making the item in house.

2. Description of the Prior Art and Related Information

Management of manufacturing concerns is often faced with the need to decide whether to make a required item or assembly in house or to buy the item or assembly from an outside supplier. However, such decisions are most often taken in an ad-hoc manner, without consistency between successive decisions and without a clear methodology for arriving at a defensible and fact-based decision. This has been the case even though many of the individual pieces of information needed to cogently make such a decision may already be separately available to the applications that present the information to the user.

The make vs. buy decision involves an estimation of the costs involved in producing the item or assembly in house, which estimated costs may be obtained from the costing and engineering departments, as well as an estimation of the costs to be incurred in sourcing suppliers of the item or assembly from a specification originated from engineering and/or marketing. At its core, the make vs. buy decision requires an evaluation of whether the difference between the make price and the buy price justifies the investment in the plant and equipment needed to manufacture in house volumes projected by the Materials Requirements Plan (hereafter, "MRP"). This is essentially an investment appraisal problem. Appraising such an investment requires answering a number of questions. For example, the decision maker must determine the amount (if any) that should be spent given the price at which the item or assembly may be purchased on the open market. Conversely, the decision maker should also determine how much to pay a supplier of the item or assembly given that the equipment needed to manufacture the item or assembly in house may be purchased for a known price.

Conventionally, the investment appraisal function is generally carried out under the auspices of the finance department. The supply base management, on the other hand, usually falls under the auspices of the purchasing department. To arrive at a principled and fact-based resolution of the make vs. buy decision often requires lengthy communication between the two departments. For example, such appraisal activities for manufacturing companies conventionally required extracting the required information form the enterprise system and inputting the extracted information into separate spreadsheets for offline analysis by finance staff. The implementation decision then has to be played back into the enterprise system. Therefore, the basis of the calculations is only known to the person that developed the spreadsheet. This approach to potential investment appraisal is inefficient, non-standardized and not integrated with the enterprise system where the relevant information resides.

From the foregoing, therefore, it is clear that improved methods, systems and tools for appraising potential investments and carrying out make or buy decisions are needed.

SUMMARY OF THE INVENTION

According to an embodiment thereof, the present invention is a computer-implemented method for deciding whether to make an item in-house or to buy the item from outside suppliers. The method may include launching a workflow to enforce a series of steps for arriving at the make or buy decision. The series of steps may include generating a market specification describing the item to be made in-house or purchased from outside suppliers; estimating a market volume for the item described in the market specification; deriving a materials requirement plan from the generated market specification and the estimated market volume; developing an engineering specification defining the item from the generated market specification; establishing a purchase price to buy the item; estimating a unit cost for producing the item in-house and determining a unit opportunity cost from the established purchase price to buy the item and the estimated in-house unit cost; extending the unit opportunity cost by the quantity of the item specified in the material requirement plan to determine a gross opportunity cost; estimating a cost of acquiring a production capacity to produce the item in-house, and determining to make the item in-house if a net present value of the gross opportunity cost is more than the estimate cost of acquiring the production capacity, otherwise determining to buy the item from at least one of the outside suppliers.

The materials requirement plan may include a bill of materials detailing components and sub-components needed to build the item, current inventory of the components and sub-components and an amount of the components and sub-components that must be purchased, phased over time. The engineering specification may include a technical description of the item and of any tooling, plant layout and materials needed to produce the item. The establishing step may include at least one step of determining whether an item matching or substantially matching requirements defined in the engineering specification is available from the outside suppliers; and placing the item defined in the engineering specification up for bid by the external suppliers. The method may further include a step of carrying out a financial justification calculation, the financial justification calculation being a difference between the net present value of the gross opportunity costs and the estimated cost of acquiring the production capacity to produce the item in-house. When it is determined to make the item in-house, the method may further carry out a step of scoring the gross opportunity cost according to how aligned making the item in-house is with non-financial criteria. The step of estimating the unit cost for producing the item in-house may include a cost of a plant and equipment needed to manufacture the item, a factory layout cost and/or a building cost, for example. The non-financial criteria may include process technology advantage, tooling technology advantage, volume and/or intellectual property protection, for example.

According to another embodiment thereof, the present invention is a machine-readable medium having data stored thereon representing sequences of instructions which, when executed by a computer, causes the computer to carry out a method for deciding whether to make an item in-house or to buy the item from outside suppliers by carrying out steps of launching a workflow to enforce a series of steps for arriving at the make or buy decision, the series of steps including generating a market specification describing the item to be made in-house or purchased from outside suppliers; estimating a market volume for the item described in the market specification; deriving a materials requirement plan from the generated market specification and the estimated market volume; developing an engineering specification defining the item from the generated market specification; establishing a purchase price to buy the item; estimating a unit cost for producing the item in-house and determining a unit opportunity cost from the established purchase price to buy the item and the estimated in-house unit cost; extending the unit opportunity cost by the quantity of the item specified in the material requirement plan to determine a gross opportunity cost; estimating a cost of acquiring a production capacity to produce the item in-house, and determining to make the item in-house if a net present value of the gross opportunity cost is more than the estimate cost of acquiring the production capacity, otherwise determining to buy the item from at least one of the outside suppliers.

According to still another embodiment, the present invention is a computer system for making a decision whether to make an item in-house or to buy the item from outside suppliers, comprising: a processor; at least one data storage device coupled to the processor; a plurality of processes spawned by said at least one processor, the processes including processing logic for: launching a workflow to enforce a series of steps for arriving at the make or buy decision, the series of steps including: generating a market specification describing the item to be made in-house or purchased from outside suppliers; estimating a market volume for the item described in the market specification; deriving a materials requirement plan from the generated market specification and the estimated market volume; developing an engineering specification defining the item from the generated market specification; establishing a purchase price to buy the item; estimating a unit cost for producing the item in-house and determining a unit opportunity cost from the established purchase price to buy the item and the estimated in-house unit cost; extending the unit opportunity cost by the quantity of the item specified in the material requirement plan to determine a gross opportunity cost; estimating a cost of acquiring a production capacity to produce the item in-house, and determining to make the item in-house if a net present value of the gross opportunity cost is more than the estimate cost of acquiring the production capacity, otherwise determining to buy the item from at least one of the outside suppliers.

According to still another embodiment, the present invention may be viewed as a computer-implemented method for determining an optimal timing for implementing an engineering change order that replaces a more expensive component with a less expensive component, comprising: launching a workflow to enforce a series of steps for determining the optimal timing, the series of steps including: generating a market specification describing the component affected by the engineering change order; estimating a market volume for the component described in the market specification; developing an engineering specification defining the component affected by the engineering change order; estimating in-house unit costs for the component affected by the engineering change order; developing an engineering change proposal from the developed engineering specification; from the developed engineering change proposal and the estimated in-house unit cost, estimating a revised in-house unit cost for the component affect by the engineering change order; from the revised in-house unit cost, determining a unit opportunity cost for the component affected by the engineering change order; from the developed engineering specification and the developed engineering change proposal, deriving a materials requirement plan; extending the unit opportunity cost by a quantity of the components required as specified by the materials requirement plan to determine a gross opportunity cost for the component affected by the engineering change order; determining an obsolescence cost from the materials requirement plan, and determining the optimal timing to implement the engineering change order by calculating when a present value of the gross opportunity cost of replacing the more expensive component with the less expensive component is equal to or greater than the determined obsolescence cost of the replaced component.

The materials requirement plan may include a bill of materials detailing components and sub-components needed to implement the engineering change order, current inventory of the components and sub-components and an amount of the components and sub-components that must be purchased, over time. The engineering specification may include a technical description of the component and of any tooling, plant layout and materials needed to implement the engineering change order.

The present invention may also be viewed, according to another embodiment thereof, as a machine-readable medium having data stored thereon representing sequences of instructions which, when executed by a computer, causes the computer to carry out a method for determining an optimal timing for implementing an engineering change order that replaces a more expensive component with a less expensive component by carrying out steps of: launching a workflow to enforce a series of steps for determining the optimal timing, the series of steps including: generating a market specification describing the component affected by the engineering change order; estimating a market volume for the component described in the market specification; developing an engineering specification defining the component affected by the engineering change order; estimating in-house unit costs for the component affected by the engineering change order; developing an engineering change proposal from the developed engineering specification; from the developed engineering change proposal and the estimated in-house unit cost, estimating a revised in-house unit cost for the component affect by the engineering change order; from the revised in-house unit cost, determining a unit opportunity cost for the component affected by the engineering change order; from the developed engineering specification and the developed engineering change proposal, deriving a materials requirement plan; extending the unit opportunity cost by a quantity of the components required as specified by the materials requirement plan to determine a gross opportunity cost for the component affected by the engineering change order; determining an obsolescence cost from the materials requirement plan, and determining the optimal timing to implement the engineering change order by calculating when a present value of the gross opportunity cost of replacing the more expensive component with the less expensive component is equal to or greater than the determined obsolescence cost of the replaced component.

The present invention is also a computer system for determining an optimal timing for implementing an engineering change order that replaces a more expensive component with a less expensive component, comprising: a processor; at least one data storage device coupled to the processor; a plurality of processes spawned by said at least one processor, the processes including processing logic for: launching a workflow to enforce a series of steps for determining the optimal timing, the series of steps including: generating a market specification describing the component affected by the engineering change order; estimating a market volume for the component described in the market specification; developing an engineering specification defining the component affected by the engineering change order; estimating in-house unit costs for the component affected by the engineering change order; developing an engineering change proposal from the developed engineering specification; from the developed engineering change proposal and the estimated in-house unit cost, estimating a revised in-house unit cost for the component affect by the engineering change order; from the revised in-house unit cost, determining a unit opportunity cost for the component affected by the engineering change order; from the developed engineering specification and the developed engineering change proposal, deriving a materials requirement plan; extending the unit opportunity cost by a quantity of the components required as specified by the materials requirement plan to determine a gross opportunity cost for the component affected by the engineering change order; determining an obsolescence cost from the materials requirement plan, and determining the optimal timing to implement the engineering change order by calculating when a present value of the gross opportunity cost of replacing the more expensive component with the less expensive component is equal to or greater than the determined obsolescence cost of the replaced component.

BRIEF DESCRIPTION OF THE DRAWINGS

FIG. 2 is a web browser screen illustrating further aspects of embodiment of the present invention for appraising potential investments.

FIG. 4 is a web browser screen illustrating further aspects of embodiment of the present invention for appraising potential investments.

DETAILED DESCRIPTION

Figure 1:
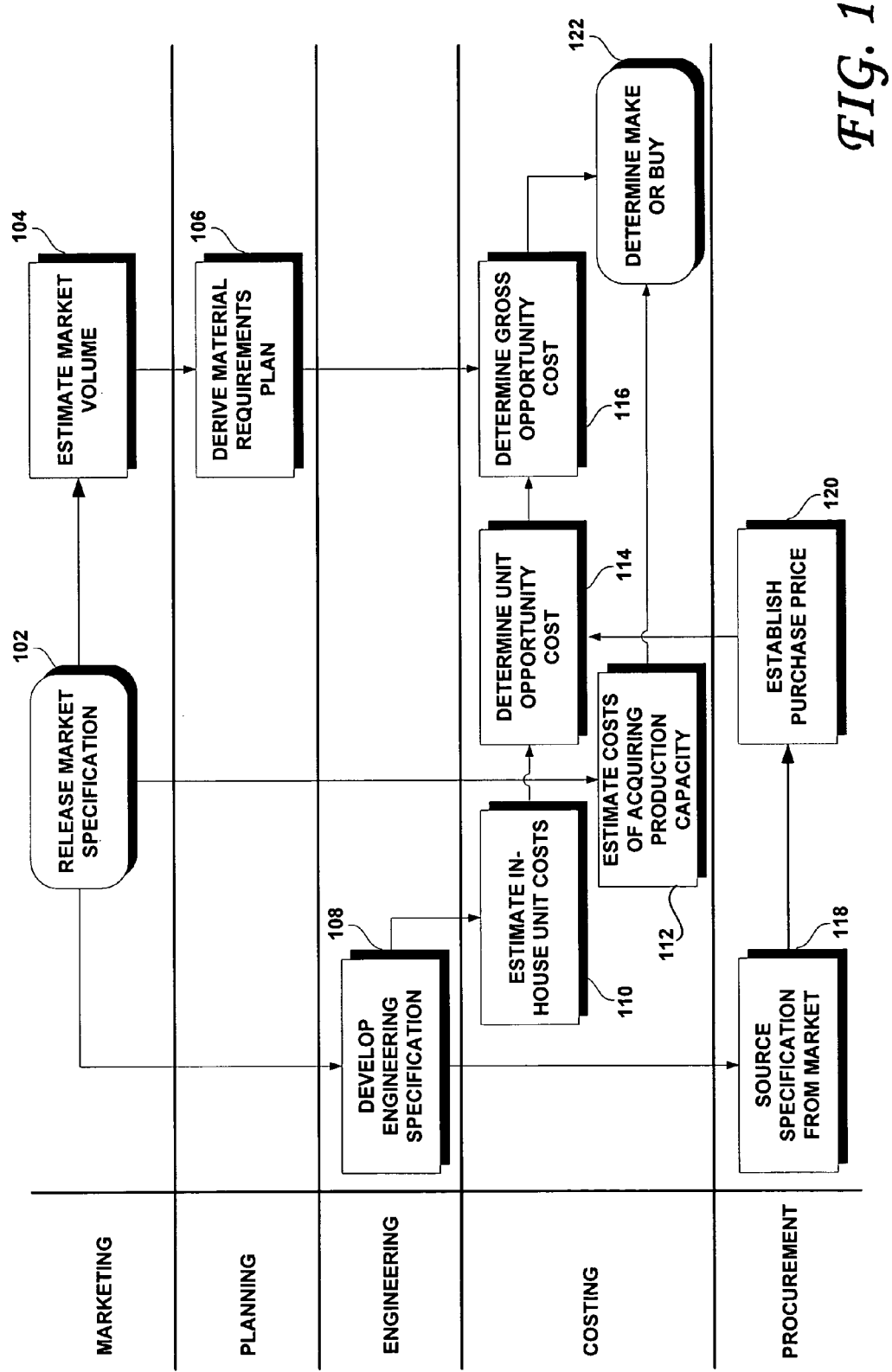
FIG. 1 is a chart illustrating a make or buy decision process workflow, according to an embodiment of the present invention.
Figure 3:
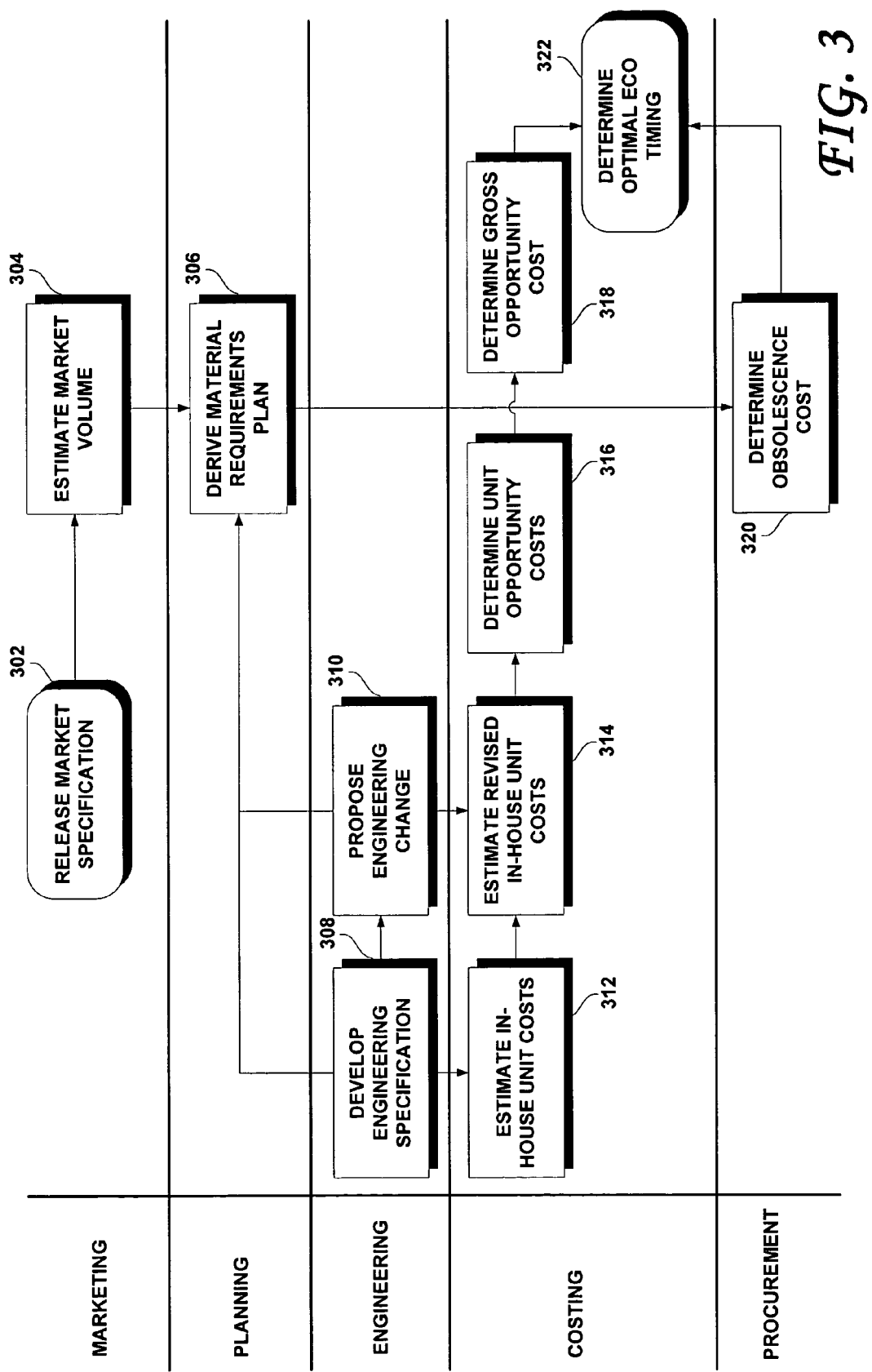
FIG. 3 is a chart illustrating a process workflow for Engineering Change Order (ECO) decisions, according to an embodiment of the present invention.

FIG. 1 is a chart illustrating a make or buy decision process workflow, according to an embodiment of the present invention. Within the context of the present invention, a workflow may be thought of as the automated enforcement of a business process, in whole or part, during which documents, information, notifications and responses or tasks are passed from one participant (such as a person, process or machine) to another participant for notification or action, according to a predetermined set of procedural rules. It is to be understood that the exemplary workflow shown in FIGS. 1 and 3 are readily extensible and may be modified according to the organizational structure, management processes and procedures particular to the business in which embodiments of the present invention are deployed.

At its core, the make or buy decision includes a comparison of the market price of the item to be purchased and the cost for which the company believes that it can manufacture the item. According to the embodiment of the present invention shown in FIG. 1, the process flow for implementing this comparison may begin with the marketing department releasing a Market Specification for the item that is the subject of the make or buy decision as shown at 102, as well as an estimate of the market volume for the item in question, as called for by reference numeral 104. The Market Specification may include a physical and/or functional description of the item, for example. From the estimate of Market Volumes issued by the marketing department, the planning department may develop a Material Requirement Plan (MRP). The MRP may be thought of as a form of backward scheduling, in which tasks are assigned start and end dates from the present backward in time. In backward scheduling, a task is schedulable if all that it produces is ready to be consumed by an already scheduled task or tasks and that the next task to be scheduled is that task in which the consumption time for the items that it produces is maximal (latest in time). To develop the MRP, the planning department may require and/or develop a Master Production Plan (MPP) detailing the anticipated demand of the item over time (e.g., by period), a Bill of Materials (BOM) detailing all of the components and sub-components that may be needed to build the item, the current inventory of the components and sub-components (if any) needed to build the item and the amount of such components and sub-components that must be purchased, phased over time. The MRP may also require other items of information, depending upon the situation.

From the Market Specification 102, the engineering department may develop an Engineering Specification 108, which is a detailed document that includes a technical description of the item and the tooling, plant layout and materials needed to produce the item that is the subject of the make or buy decision. The Engineering Specification enables the costing department to develop an estimate of the in-house unit cost for the item that is the subject of the make or buy decision, as shown at 110 in FIG. 1. The estimate of the in-house unit cost 110 includes the cost of manufacturing the item in house. However, it is unlikely that if only the estimated unit manufacturing costs 110 are considered that the market price will be less than the in house manufacturing projections. It should be realized, therefore, that the true opportunity costs for the decision may be much more than the estimated unit cost of manufacturing 110. The estimate of in-house unit costs preferably should include at least the costs of the plant, the plant re-layout costs, as well as the costs of acquiring and running the equipment needed to manufacture the item. Such costs are estimated and aggregated within reference 112, which calls for an estimate of the costs of acquiring the production capacity to produce the subject item.

The procurement department may then determine whether an item matching or substantially matching the requirements stated in the Engineering Specification 108 is readily available on the open market or, for example, may put the item defined by the Engineering Specification 108 up for bid by external manufacturers, as shown at 118. From this or by other means, the procurement department may determine the purchase price of the item on the open market as shown at 120, thereby establishing one of the bases for making the make or buy decision.

From the established purchase price 120 and the estimate of the in-house production costs 110, the costing department may establish the opportunity cost per unit of the item that is the subject of the make or buy decision, as called for by reference number 114. The Unit Opportunity Cost (UOC) may be defined as the difference between the estimated unit cost of manufacturing the item in-house (reference 110) and the unit cost from the market 120. The UOC then allows the costing department to determine the Gross Opportunity Costs (GOC), which is the UOC extended by the number of units required (per period, for example), as specified by the MRP 106. For example, if the projected manufacturing cost is $10.00 and the purchase price from the market is $12.00, the UOC is 2 dollars. The UOC is then multiplied by the quantities specified in the MRP 106 to determine the cash flows for the GOC, and the dates of those cash flows. From the GOC 116 and the estimate of acquiring the production capacity 112, the make or buy decision may be made, as shown at 122.

Once the UOC is determined, the Net Present Value (NPV) thereof may be calculated. The NPV may be defined as the difference between the present value of an investment's future net cash flows and the initial investment. A positive difference indicates an investment that should be made, unless a more attractive investment opportunity exists. A Financial Justification Calculation (FJC) may then be carried out, which FJC may be expressed as the difference between the NPV of the opportunity costs and the costs of Plant, Equipment and Re-layout. The cost of plant equipment and re-layout costs may be in the form of a capital request. The resultant cash flows may be discounted to calculate such financial metrics as the NPV, the Internal Rate of Return (IRR), the Payback Period and the Investment Performance. The IRR may be thought of as the rate or return that would make the present value of future cash flows plus the final market value of an investment equal the current market price of the investment. The Payback Period may be defined as the amount of time taken to break even on an investment, ignoring the time value of money and cash flows after the payback period. The Investment Performance may be defined as the ratio between the NPV of the investment and the initial investment value.

According to an embodiment of the present invention, the investment opportunity may be scored, (e.g., Highly Aligned through Highly Misaligned) against corporate objectives. This scoring allows competing investments proposals to be ranked for both their financial justification but also for their respective contributions toward non-financial goals. Each of these financial metrics may be assigned different weightings based upon how the company evaluates the investment opportunity. For example, a company may be attempting to maximize its Net Present Value (NPV) and be unwilling to commit the funds for long periods of time to achieve a higher NPV. In that case, the Payback Period financial metric (which ignores the time value of money) would be assigned a higher weighting than the NPV financial metric.

FIG. 2 shows a web browser showing further aspects of an application according to an embodiment of the present invention. As show, the browser 202 displays a chart 204 enabling the user to quantify aspects of the make or buy decision. As shown, the chart 204 may specify the Discount Rate (in this example, an illustrative 10% is used), the As of Date (the date from which the calculations presented in the chart 204 are made) and the Daily Discount Rate.

As shown, the chart 204 may also list the item number (in this exemplary case, the item number is 1001) of the item that is the subject of the make or buy decision. The quantities of the items 1001 called for by the MRP and the dates at which the MRP specifies that these items are needed are listed in the chart 204 in the "MRP Quantity" and "Schedule Date" columns, respectively. The Variable Unit Cost of item 1001 is listed in the chart 204 as $120, and the Purchase Price for item 1001 is $150. The Purchase Price may be thought of as the price of the item 1001 on the open market. The difference between the Purchase Price and the Variable Unit Cost represents the Unit Opportunity Cost—in this case $30. The Total Opportunity Cost is $3000, which the Unit Opportunity Cost extended by the quantity specified in the MRP (in this case 100 units) for the period in question. The chart 204 may also list the Days to Discount, as measured from the As of Date (in this example, Jan. 1, 2003). The Days to Discount, therefore, represents the number of days between the As of Date and the date at which the cash flow occurs for manufacturing or buying the item. The resulting Net Present Value is shown in the "NPV" column, which represents the Total Opportunity Costs, discounted by the Discount Rate for the number of days listed in the Days to Discount column. The Present Value of the Opportunity Cost is also shown in the chart 204. The Present Value of the Opportunity Costs reflects discounted future cash flows by an interest rate that is sufficient to cover the risk of the investment and the time value of money, which in turn reflects the human preference for having money (or utility) now versus having money (or utility) in the future.

The true opportunity costs for the Make/Buy decision should include considerations other than just the unit cost of manufacturing the item in question. Indeed, the cost of the Plant and Equipment needed to manufacture the item should also be considered as should the cost of (re)laying out the factory to produce the item. Therefore, the chart 204 preferably also quantifies and provides the Plant, Floor (Re)layout and the Building Costs. The Plant, Floor Layout and Building Costs are costs that must be incurred to make the item in-house. In this example, these costs are estimated to be $53,750.

From a purely financial point of view, the chart 204 enables the decision maker to compare the NPV of the Opportunity Cost with the sum of the costs related to the building, (re)layout and Plant that may be necessary to produce the item in question in house rather than outsourcing its manufacture. In this manner, the decision maker may gain a full financial picture of the financial effects of manufacturing the item in house versus purchasing the item on the open market or otherwise obtaining the item from outside the company.

As alluded to above, the Make/Buy decision, however, may not be a purely financial decision, as manufacturing the item in question in-house may have a strategic value to the company. That is, the appropriateness of investment necessary to make an item in-house, as opposed to buying it on the open market, may be scored or ranked to indicate the degree to which the investment is aligned with the overall business strategy of the company. This strategic value may be quantized and weighted according to identified strategic criteria. Examples of such strategic criteria may include, for example, Process Technology Advantage, Tooling Technology Advantage, Volume and/or Intellectual Property Protection. The alignment of the investment with overall business strategy and/or core competences may also be evaluated and quantified (e.g., given a score). For example, the Volume strategic criteria may be assigned a higher weight if outsourcing the manufacture of a given component means that the factory is under capacity. In that case, it may well be to the company's strategic advantage vis-à-vis its competitors to retain manufacturing that is not aligned.

FIG. 3 is a chart illustrating a process workflow for Engineering Change Order (ECO) decisions, according to an embodiment of the present invention. According to the embodiment of the present invention of FIG. 3, the process flow for implementing an ECO may begin with the marketing department releasing a Market Specification 302 for the component that is the subject of the ECO, as well as an Estimate of the Market Volume for the component in question, as called for by reference numeral 304. The Market Specification may include a physical and/or functional description of the component incorporating the engineering change, for example.

The engineering department may develop an Engineering Specification for the ECO, as shown at 308. An engineering change proposal may then be developed from the developed engineering specification 308. The developed Engineering Specification 308 and the proposed Engineering Change 310 may then be used by the planning department, together with the estimated Market Volume 304 from marketing, to develop the MRP for the engineering change order, as shown at 306. From the developed Engineering Specification 308, the costing department may estimate the in-house unit cost for the component incorporating the proposed Engineering Change Order, as shown at 312. From this estimate and the engineering department's engineering change 310, the costing department may issue a revised in-house unit cost 314.

The costing department may then establish the Unit Opportunity Cost (UOC) of the component that is the subject of the engineering change order, as shown at 316. The UOC may be defined as the difference between the estimated unit cost of making the engineering change to the subject component after implementation of the engineering change order and the unit cost of the component prior to implementing the engineering change order. The UOC 316 then allows the costing department to determine the Gross Opportunity Costs (GOC), which is the UOC extended by the number of units required (per period, for example), as specified by the MRP 306. The UOC may then be multiplied by the quantities specified in the MRP 306 to determine the cash flows for the GOC 318, and the dates of those cash flows. From the derived MRP 306, the procurement department may determine the obsolescence cost 320 for the component that is the subject of the engineering change order. The obsolescence cost may be thought of as the cost of materials that have no use when they are replaced on a Bill of Materials by a superceding component (for example, a new component, new ingredient or new process). The cost of the inventory on hand of the superceded component may be charged to the company's profit and loss statement. The engineering change may, for example, be to replace a component (ingredient, process) of higher cost with a component (ingredient, process) of lower cost. This means that the ECO timing decision includes balancing the cost of obsolescence with the opportunity cost of not implementing the ECO that implements the change. The timing of an engineering change, therefore, affects the obsolescence costs of the superceded component on a Bill of Material. As shown in FIG. 3, from the Gross Opportunity Cost 318 and the determined obsolescence cost 320, the company may determine the optimal timing of the engineering change order, as shown at 322. According to an embodiment of the present invention, optimal ECO timing is where the present value of the Opportunity Cost of replacing a more expensive component (ingredient, or process) with a less expensive component (ingredient or process) is equal to or greater than the cost of Obsolescing (throwing away or otherwise disposing of) the superceded component (ingredient or process).

When the ECO is implemented, the cost of the goods sold will be lower (assuming the engineering change order replaces a higher cost component (ingredient, process) with a comparatively lower cost component (ingredient, process). The impact and timing of the reduced cost of goods sold may be obtained by multiplying the difference between the rolled up cost of the component without the ECO implemented and the rolled up cost of the component to be manufactured after the Bill Of Materials has been changed to reflect the ECO. This will yield a Unit Opportunity Cost. The opportunity cost reduces as the component is consumed by the Material Requirements in the Material Requirements Plan. The difference in those cash flows may be discounted back to the same date as the write-off of the obsolescence costs. The Unit Opportunity Cost may be extended to determine the Gross Opportunity Cost my multiplying by the quantity specified in the Material Requirements Plan. Embodiments of the present invention enables balancing the net present value of the lower costs of goods (subject to the ECO) sold by integrating with the quantities required from the Material Requirements Plan.

FIG. 4 is a web browser screen illustrating further aspects of embodiment of the present invention for appraising potential investments. As shown, the ECO timing optimization chart generated by the shown embodiment of the present invention details the cost of obsolescing a component (ingredient or process) over time, as the components are consumed as called for by the MRP, as compared with the Opportunity Costs of implementing the ECO. At reference numeral 402, the chart of FIG. 4 details the obsolescence costs of maintaining the component that is the subject of the engineering change order on-hand (e.g., in inventory). In the example of FIG. 4, 400 units of the component are on-hand, each of which is valued at $30, for a total value of the components on-hand of $12,000. The chart of FIG. 4 also notes the Discount Rate (the interest rate used in discounting future cash flows), the As of Data (the date from which the present calculations are made), and the Daily Rate.

As shown at reference numeral 404, the chart may list an component number or identifier (in this exemplary case, the component number is 1001), the MRP quantity (the quantity of component 1001 called for by the Material Requirement Plan), and the Schedule Date (the date at which the Material Requirement Plan specifies that component 1001 is needed or will be consumed). The Pre ECO Standard Cost is listed, as is the Post ECO Standard Cost. The Pre ECO Standard Cost may be thought of as the rolled up cost of the product to be manufactured with the old component (the component that is the subject of the ECO) in the Bill of Materials. Likewise, the Post ECO Standard Cost may be thought of as the rolled up cost of the new component (the component that is to replace the old component and that is the subject of the ECO) in the Bill of Materials. The Unit Opportunity Cost is also shown, and is the difference between the Pre and Post ECO Standard Costs—in this exemplary case, $30. The Unit Opportunity Cost is then extended by the number of units required by the MRP (shown in the MRP Quantity column) to yield the Total Opportunity Cost in this case, $300. The Days to Discount are also listed, which column lists the difference in the number of days between the As of Date (in this case, Jan. 1, 2003) and the date listed in the Schedule Date column. The Net Present Value (NPV) column lists the difference between the Total Opportunity Cost discounted by the number of days listed in the Days to Discount column. This amount represents the difference in cash flow between the As of Date and the date at which the cash flow is scheduled to occur, as called for by the MRP. For example, a cash flow of $3,000 120 days from the As of Date is equivalent to $2894 invested on the As of Date for 120 days at the specified Daily Rate. Fundamentally, it is a measure of the present value (as measured from the As of Date) that must be foregone in return for the Cash Flow in the future, as specified in the Days to Discount. Finally, the values in the Remaining Obsolescence column represent the value of the quantity of the component that is to be replaced (obsolesced) remaining in inventory (on-hand) at the time that the ECO obsoletes the component. The quantity of the component in inventory is projected to be diminished by the MRP from the As of Date until the MRP Schedule Date.

With reference to FIG. 4, 400 units of the component to be obsolesced are on-hand, each of which is valued at $30, for a total value of the components on-hand of $12,000, as of Jan. 1, 2003, the As of Date. On the first MRP Schedule Date of Jan. 1, 2003, the MRP calls for 100 of the units to be consumed, which have a non-discounted Net Present Value of $3000, which leaves $9,000 of the component to be obsolesced in inventory. 30 days later, the MRP calls for 100 additional components to be consumed, which have a NPV of $2,973. Using this NPV, the value of the component to be obsolesced is $6,027, which is the difference of the Remaining Obsolescence in the previous period and the NPV of the components consumed in the next period (in this case, 30 days hence). Therefore, the Remaining Obsolescence as of Jan. 31, 2003 is $9,000−$2,973=$6027, which is the NPV of the components in inventory projected 30 days from the As of Date of Jan. 1, 2003. Continuing on, it can be seen that the Remaining Obsolescence drops to zero as of the Schedule date of May 1, 2003, indicating the most economical (i.e., optimal) date at which to implement the ECO, assuming no further components are added to inventory in the interim.

Figure 5:
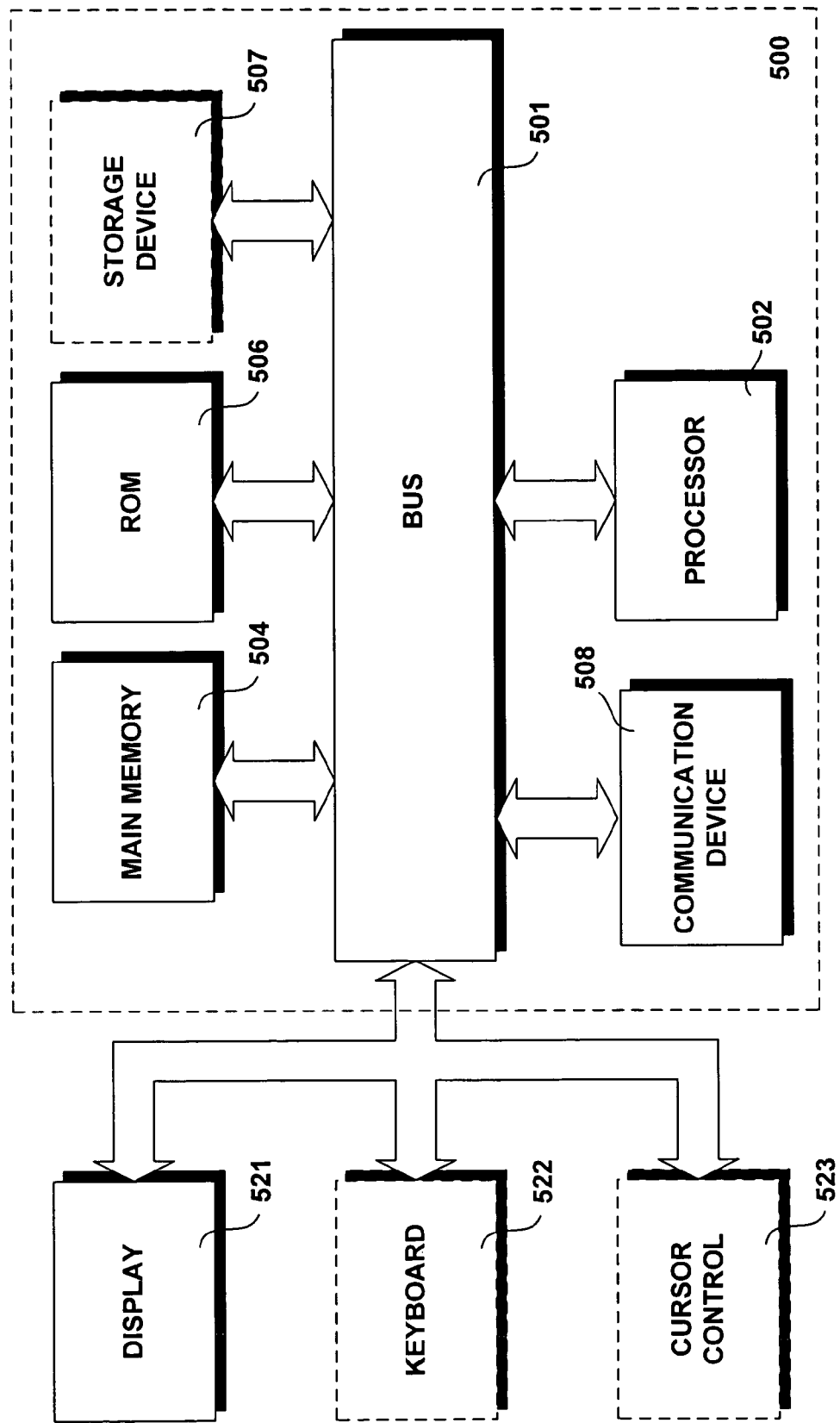
FIG. 5 is a block diagram of a general-purpose computer with which aspects of the present invention may be carried out.

FIG. 5 illustrates a block diagram of a computer 500 with which an embodiment of the present invention may be implemented. Computer system 500 includes a bus 501 or other communication mechanism for communicating information, and a processor 502 coupled with bus 501 for processing information. Computer system 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also includes a read only memory (ROM) and/or other static storage device 506 coupled to bus 501 for storing static information and instructions for processor 502. A data storage device 507, such as a magnetic disk or optical disk, is coupled to bus 501 for storing information and instructions.

Computer system 500 may also be coupled via bus 501 to a display device 521, such as a cathode ray tube (CRT), for displaying information to a computer user. An alphanumeric input device 522, including alphanumeric and other keys, is typically coupled to bus 501 for communicating information and command selections to processor 502. Another type of user input device is cursor control 523, such as a mouse, a trackball, or cursor direction keys for communicating direction information and command selections to processor 502 and for controlling cursor movement on display 521.

The present invention is related to the use of computer system 500 to provide methods and systems for evaluating make vs. buy decisions according to embodiments of the present invention. According to one embodiment, the methods according to the present invention are implemented by one or more computer systems 500 in response to processor(s) 502 executing sequences of instructions contained in memory 504. Such instructions may be read into memory 504 from another computer-readable medium, such as data storage device 507. Execution of the sequences of instructions contained in memory 504 causes processor(s) 502 to perform the process steps that are described above. In alternative embodiments, hard-wired circuitry may be used in place of or in combination with software instructions to implement all or selected portions of the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Indeed, those of skill in this art will recognize other alternative embodiments and all such embodiments are deemed to fall within the scope of the present invention. Thus, the present invention should be limited only by the claims as set forth below.

What is claimed is:

1. A computer-implemented method for facilitating decisions to make an item in-house or to buy the item from one or more outside suppliers, the method comprising:
   receiving, at one or more computers, information defining a workflow corresponding to a business process for arriving at a make or buy decision for the item, wherein the information configures the one or more computers to enforce one or more aspects of the business process;
   generating, with one or more processors associated with the one or more computer systems, information configured for determining whether to buy or make the item using quantifications of the make decision, quantifications of the buy decision, and anticipated quantity of the item needed within a predefined time period; and
   generating, with one or more processors associated with the one or more computer systems, information configured for determining whether to buy or make the item using quantifications of a strategic value of either the make decision or the buy decision according to a set of strategic criteria indicative of a degree to which a decision is aligned with at least one predetermined business strategy based on information obtained through enforcement of the one or more aspects of the business process through the workflow;
   wherein enforcement of the one or more aspects of the business process through the workflow includes:
      receiving, at the one or more computers, a market specification for the item from one or more workflow participants in a marketing department;
      receiving, at the one or more computers, information estimating a market volume for the item;
      receiving, at the one or more computers, a material equipment plan from one or more workflow participants in a planning department;
      receiving, at the one or more computers, an engineering specification from one or more workflow participants in an engineering department;
      receiving, at the one or more computers, information establishing a purchase price to buy the item;
      receiving, at the one or more computers, information estimating a unit cost for producing the item in-house from one or more workflow participants in a costing department of the enterprise;
      receiving, at the one or more computers, information estimating a cost of acquiring a production capacity to produce the item in-house; and
      receiving, at the one or more computer systems, a score and weight for each strategic criteria in the set of strategic criteria.

2. The computer-implemented method of claim 1, wherein receiving the materials requirement plan from the one or more workflow participants in the planning department includes receiving a bill of materials detailing components and sub-components needed to build the item, current inventory of the components and sub-components and an amount of the components and sub-components that must be purchased, phased over time.

3. The computer-implemented method of claim 1, wherein receiving the engineering specification from the one or more workflow participants in the engineering department includes receiving a technical description of the item and of any tooling, plant layout and materials needed to produce the item.

4. The computer-implemented method of claim 1, wherein receiving the information establishing a purchase price to buy the item from the one or more workflow participants in the purchasing department includes at least one of:

receiving information indicating whether an item matching or substantially matching requirements defined in the engineering specification is available from the outside suppliers; or receiving information placing the item defined in the engineering specification up for bid by the outside suppliers.

5. The computer-implemented method of claim 1, wherein enforcement of the one or more aspects of the business process through the workflow further includes receiving, at the one or more computers, information indicative of a financial justification calculation, the financial justification calculation being a difference between the net present value of the gross opportunity costs and the estimated cost of acquiring the production capacity to produce the item in-house.

6. The computer-implemented method of claim 1, wherein receiving information estimating the unit cost for producing the item in-house includes receiving at least one of a cost of a plant and equipment needed to manufacture the item, a factory layout cost, and a building cost.

7. The computer-implemented method of claim 1, wherein the set of strategic criteria include at least one of process technology advantage, tooling technology advantage, volume, or intellectual property protection.

8. A non-transitory computer-readable medium storing computer-executable code for facilitating decisions to make an item in-house or to buy the item from one or more outside suppliers, the non-transitory computer-readable medium comprising:

code for receiving information defining a workflow corresponding to a business process for arriving at a make or buy decision for the item, wherein the information configures one or more computers to enforce one or more aspects of the business process;

code for generating, with one or more processors associated with the one or more computer systems, information configured for determining whether to buy or make the item using quantifications of the make decision, quantifications of the buy decision, and anticipated quantity of the item needed within a predefined time period; and code for generating information configured for determining whether to buy or make the item using quantifications of a strategic value of either the make decision or the buy decision according to a set of strategic criteria indicative of a degree to which a decision is aligned with at least one predetermined business strategy based on information obtained through enforcement of the one or more aspects of the business process through the workflow;

wherein enforcement of the one or more aspects of the business process through the workflow includes:

receiving, at the one or more computers, a market specification for the item from one or more workflow participants in a marketing department;

receiving, at the one or more computers, information estimating a market volume for the item;

receiving, at the one or more computers, a material equipment plan from one or more workflow participants in a planning department;

receiving, at the one or more computers, an engineering specification from one or more workflow participants in an engineering department;

receiving, at the one or more computers, information establishing a purchase price to buy the item;

receiving, at the one or more computers, information estimating a unit cost for producing the item in-house from one or more workflow participants in a costing department of the enterprise;

receiving, at the one or more computers, information estimating a cost of acquiring a production capacity to produce the item in-house; and receiving, at the one or more computer systems, a score and weight for each strategic criteria in the set of strategic criteria.

9. The non-transitory computer-readable medium of claim 8, wherein receiving the materials requirement plan from the one or more workflow participants in the planning department includes receiving a bill of materials detailing components and sub-components needed to build the item, current inventory of the components and sub-components and an amount of the components and sub-components that must be purchased, phased over time.

10. The non-transitory computer-readable medium of claim 8, wherein receiving the engineering specification from the one or more workflow participants in the engineering department includes receiving a technical description of the item and of any tooling, plant layout and materials needed to produce the item.

11. The non-transitory computer-readable medium of claim 8, wherein receiving the information establishing a purchase price to buy the item from the one or more workflow participants in the purchasing department includes at least one of:

receiving information indicating whether an item matching or substantially matching requirements defined in the engineering specification is available from the outside suppliers; or receiving information placing the item defined in the engineering specification up for bid by the outside suppliers.

12. The non-transitory computer-readable medium of claim 8, wherein enforcement of the one or more aspects of the business process through the workflow further includes receiving, at the one or more computers, information indicative of a financial justification calculation, the financial justification calculation being a difference between the net present value of the gross opportunity costs and the estimated cost of acquiring the production capacity to produce the item in-house.

13. The non-transitory computer-readable medium of claim 8, wherein receiving information estimating the unit cost for producing the item in-house includes receiving at least one of a cost of a plant and equipment needed to manufacture the item, a factory layout cost, and a building cost.

14. The non-transitory computer-readable medium of claim 8, wherein the set of strategic criteria include at least one of process technology advantage, tooling technology advantage, volume advantage, or intellectual property protection.

* * * * *